Patented Dec. 30, 1952

2,623,879

UNITED STATES PATENT OFFICE 2,623,879

SUBSTITUTED BENZIMIDAZOLES

Eugene L. Ringwald and Alfred B. Craig, Dayton, Ohio, assignors, by mesne assignments, to The Chemstrand Corporation, a corporation of Delaware No Drawing. Application November 27, 1950, Serial No. 197,828

6 Claims. (Cl. 260—309.2)

This invention relates to new chemical compounds having unusual value in the synthetic plastic field. More specifically the invention relates to cyclic nitrogen compounds having active allyl type olefinic groups.

The acrylonitrile polymers and copolymers are well-known to be useful in the fabrication of synthetic fibers, but most of these compositions are generally inactive and do not accept dyestuffs readily. It is common practice in this art to copolymerize a large proportion of acrylonitrile with a minor proportion of a more reactive monomer so that the resulting copolymer will combine chemically with commercial dyestuffs. In this manner general purpose fibers of good quality may be prepared by conventional methods.

The primary purpose of this invention is to provide a new class of chemical compounds, which are readily polymerizable with acrylonitrile and which are required only in small proportions to develop the necessary dye acceptance. A further purpose of this invention is to prepare a new class of compounds by a simple procedure from readily available raw materials. Other purposes will be evident from the description hereinafter set forth.

The new class of compounds prepared in accordance with the practice of this invention may be represented by the following structural formula:

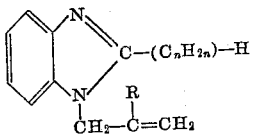

wherein R is a radical of the group consisting of hydrogen, methyl and chlorine and $n$ is a small whole number from zero (0) to four (4), inclusive. The most important compounds included within the scope of the above structural formula are 1-allylbenzimidazole, 1-methallylbenzimidazole, 1-chloroallylbenzimidazole, 1-allyl-2-methylbenzimidazole, 1-methallyl-2-methylbenzimidazole, and 1-chloroallyl-2-methylbenzimidazole. Obviously, other near homologues of these compounds will be similarly useful and almost as effective as the named compounds.

The new chemical compounds may be prepared from benzimidazole and the halides of the olefin compound containing the desired unsaturated radical. Thus, allyl bromide, chloroallyl bromide, methallyl bromide and the corresponding chlorides, iodides and fluorides may be reacted with benzimidazole to produce the various new compounds. It is necessary to add reagents suitable for removing the halogen atom from the reaction medium, for example sodium methylate, sodium hydroxide, pyridine, triethylamine and sodium hydride. By the selection of the proper reagent the halogen-containing by-product will be precipitated in a form which is readily separated by normal filtration procedures.

The new class of chemical compounds are readily polymerizable with a wide variety of organic olefinic derivatives, and especially with acrylonitrile. The new monomers have the chemical reactivity with many dyestuffs, including all of the so-called acid dyestuffs. Thus, the new compounds have the capacity for taking dye even when in the polymeric state or in the form of copolymers with other known monomers.

Further details of this invention are set forth with respect to the following specific examples:

Example 1

A 15 per cent solution of one mole weight of sodium methylate was first prepared and then mixed with one mole weight of benzimidazole. The mixture so prepared was then gradually treated dropwise with one mole weight of allyl bromide at a rate which permitted a vigorous but controlled exothermic reaction. After all of the reagents had been combined and the reaction had subsided, the mixture was gradually warmed, and finally heated at reflux temperature for 18 hours. A white solid salt, sodium bromide, which was precipitated during the reaction, was separated by filtration. The filtrate was then distilled at 2.5 mm. total pressure and the fraction boiling between 133° C. and 135° C. was separated and identified as 1-allyl-benzimidazole having the structure

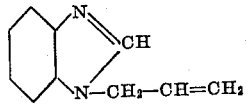

Example 2

A thin toluene slurry of one mole weight of sodium hydride was prepared and heated to 100° C., after which one mole weight of 2-methylbenzimidazole was added gradually over a one hour period. One mole of allyl bromide was then added dropwise at a rate which permitted a gradual controlled evolution of hydrogen during the reaction. After all reagents were combined the heating was continued for 16 hours. After cooling the mixture was mixed with 50 per cent of its volume of water. The non-aqueous phase which was formed was separated and distilled at reduced pressure. A fraction boiling at 148 to 150° C. at four mm. was recovered and identified as 1-allyl-2-methylbenzimidazole having the structure

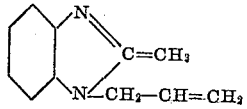

The invention is defined by the following claims.

What we claim is:

1. A new compound having the structural formula

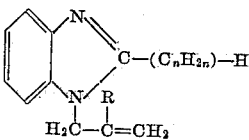

wherein R is a radical selected from the group consisting of hydrogen, chlorine and methyl, and $n$ is a small whole number from zero (0) to four (4), inclusive.
2. 1-allylbenzimidazole.
3. 1-chloroallylbenzimidazole.
4. 1-methallylbenzimidazole.
5. 1-allyl-2-methylbenzimidazole.
6. 1-methallyl-2-methylbenzimidazole.

EUGENE L. RINGWALD.
ALFRED B. CRAIG.

REFERENCES CITED

The following references are of record in the file of this patent:

FOREIGN PATENTS

| Number | Country | Date |
|---|---|---|
| 708,262 | Germany | June 5, 1941 |

OTHER REFERENCES

Chemical Abstracts, vol. 17, pp. 2711–2712, citing Sarosin, Helvitica Chim. Acta. 6, 370–376 (1923).

Bubler et al.: Jr. Amer. Chem. Soc., vol. 71, pp. 3120–3122, September 1949.